US006310767B1

United States Patent
Spear et al.

(10) Patent No.: US 6,310,767 B1
(45) Date of Patent: Oct. 30, 2001

(54) SHIELD FOR A DISPLAY UNIT

(75) Inventors: Phillip G. Spear, Villa Park; John R. Vallee, Joliet, both of IL (US)

(73) Assignee: Case Corporation, Racine, WI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/258,485

(22) Filed: Feb. 26, 1999

(51) Int. Cl.[7] .............................. G06F 1/16; G02F 1/1333; G02F 1/1343
(52) U.S. Cl. ......................... 361/681; 361/679; 353/119; 353/122; 349/58; 345/905; 312/7.2; 312/223.1; 248/917
(58) Field of Search ..................................... 361/679, 681, 361/682, 683, 739, 746, 751; 349/58; 353/119, 120, 122, DIG. 3, DIG. 5; 345/169, 905; 312/223.1–223.6, 7.2; 248/917–924

(56) References Cited

U.S. PATENT DOCUMENTS

| 4,246,613 | 1/1981 | Choder et al. . | |
|---|---|---|---|
| 4,381,421 | 4/1983 | Coats et al. . | |
| 4,670,347 | 6/1987 | Lasik et al. . | |
| 5,422,751 | * 6/1995 | Lewis et al. | 361/681 |
| 5,450,221 | * 9/1995 | Owen et al. | 359/83 |
| 5,521,612 | 5/1996 | Johansson . | |
| 5,548,084 | * 8/1996 | Tracy | 174/35 R |
| 5,561,893 | * 10/1996 | Lee | 29/434 |
| 5,574,625 | * 11/1996 | Ohgami et al. | 361/684 |
| 5,666,261 | * 9/1997 | Aguilera | 361/681 |
| 5,705,860 | 1/1998 | Ninh et al. . | |
| 5,928,320 | * 7/1999 | Forsythe | 361/681 |
| 6,157,423 | * 12/2000 | Stonebraker et al. | 349/58 |
| 6,160,701 | * 12/2000 | Baker et al. | 361/683 |

FOREIGN PATENT DOCUMENTS 0 642 089 A1 * 8/1994 (EP) ............................ G06F/15/02

* cited by examiner

Primary Examiner—Leo P. Picard
Assistant Examiner—Lisa Lea-Edmonds
(74) Attorney, Agent, or Firm—Foley & Lardner

(57) ABSTRACT

A display unit is disclosed herein. The display unit includes at least one electronic component, a display, and a body. The display is coupled to the at least one electronic component. The body extends about the at least one electronic component and supports the display. The body includes a front portion, a rear portion, a bottom portion, and a panel. The front portion is on a first side of the at least one electronic component and supports the display. The rear portion is on a second opposite side of the at least one electronic component. The bottom portion extends between the front portion and rear portion below the at least one electronic component. The panel extends between the at least one electronic component and the display. The panel includes at least one layer integrally formed as part of a single unitary body with at least one of the front portion, the rear portion, and the base portion, whereby the plane shields emanations emitted from the at least one electronic component and minimizes adverse effects of the emanations on the display.

28 Claims, 3 Drawing Sheets

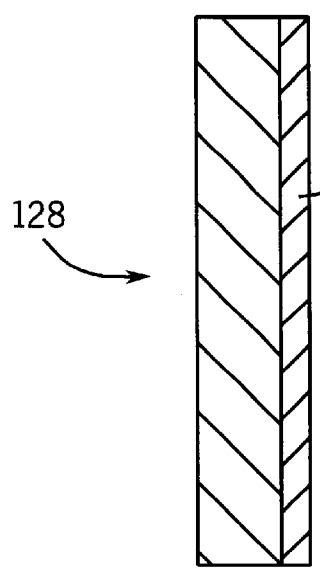
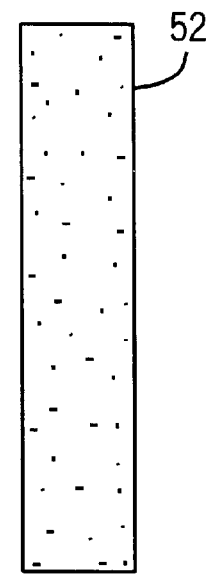
FIG. 4  FIG. 5
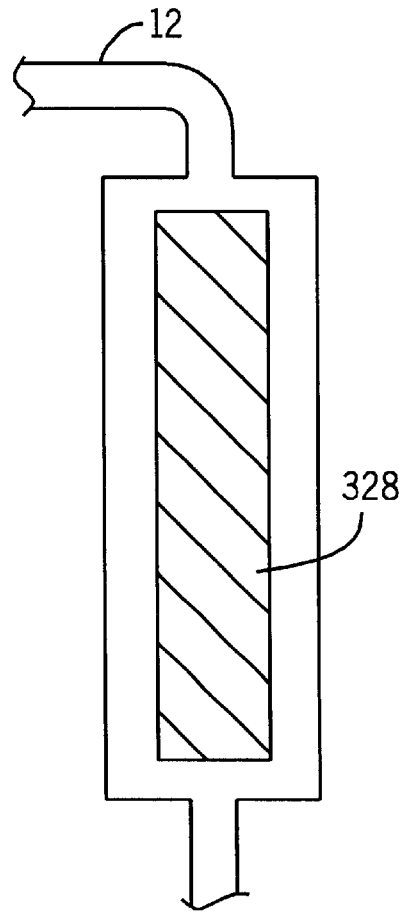
FIG. 6

SHIELD FOR A DISPLAY UNIT

FIELD OF THE INVENTION

The invention relates generally to the field of encasings for electronic equipment. More particularly, the invention relates to an apparatus for shielding emanations from electronic equipment in a display unit.

BACKGROUND OF THE INVENTION

Electronic equipment generates electric "noise," including, for example, electromagnetic interference (EMI) and radio frequency (RF). In some applications, EMI may be of such a level as to be hazardous to nearby personnel. EMI from electronic equipment can also cause deleterious effects to other electronic equipment. Furthermore, if EMI from an electrical unit reaches a high level, the unit may be judged unsafe by governmental agencies such as the Federal Communications Commission and be required to be recalled and redesigned by the manufacturer.

One attempt to reduce the effects that electrical emanations (such as EMI) have on other electronic equipment is redesigning circuit components. Such redesigning is costly and has limited effects on minimizing electrical emanations.

Another conventional attempt to reduce the effects of electrical emanations includes using a foil shield, placed around the electronic circuitry and connected to ground. Such a shield can reduce in-line metal radiation from electronic circuitry. The foil shield is constructed by adhesively coating an aluminum or cooper foil on both sides of the circuitry and applying an outer wrapping layer of polyester or plastic material thereto. Such aluminum and cooper foil shielding is costly to manufacture and not sufficiently durable.

One conventional attempt to shield electrical emanations in display units has been to place a metal shield between the electrical equipment of the display unit and the display screen. The metal shield is generally a separate piece added at some stage in the manufacturing process. However, having an additional and separate shielding piece is difficult to install and obtain maximum shielding.

Thus there is a need for an apparatus which shields emanations emitted from electronic equipment within a display unit, which is durable and which improves shielding efficiency. Even further, there is a need for a shield which minimizes electrical noise escaping from the display unit without making manufacturing, installation, or assembly difficult or costly.

SUMMARY OF THE INVENTION

One embodiment of the invention relates to a display unit. The display unit includes at least one electronic component, a display, and a body. The display is coupled to the at least one electronic component. The body extends about the at least one electronic component and supports the display. The body includes a front portion, a rear portion, a bottom portion, and a panel. The front portion is on a first side of the at least one electronic component and supports the display. The rear portion is on a second opposite side of the at least one electronic component. The bottom portion extends between the front portion and rear portion below the at least one electronic component. The panel extends between the at least one electronic component and the display. The panel includes at least one layer integrally formed as part of a single unitary body with at least one of the front portion, the rear portion, and the base portion, whereby the plane shields emanations emitted from the at least one electronic component and minimizes adverse effects of the emanations on the display.

Another embodiment of the invention relates to a display unit. The display unit includes electronic equipment, a housing encasing the electronic equipment, a display coupled to the electronic equipment, and a means for shielding emanations emitting from the electronic equipment. The shielding means is integrally formed as a part of a single unitary body with the housing and located between the electronic equipment and the display.

Another embodiment of the invention relates to a display unit which shields emanations emitting from within the display unit, whereby interference with electronic equipment not contained within the display unit is minimized. The display unit includes electronic equipment, a housing extending about the electronic equipment, a display coupled to the electronic equipment, and a shield. The shield is integrally formed as part of a single unitary body with the housing and located between the electronic equipment and the display.

BRIEF DESCRIPTION OF THE DRAWINGS

The invention will become more fully understood from the following detailed description, taken in conjunction with the accompanying drawings, wherein like reference numerals refer to like elements, in which:

FIG. 4 is a sectional view of a second exemplary embodiment of the shield of FIG. 2;

FIG. 5 is a sectional view of a third exemplary embodiment of the shield of FIG. 2; and FIG. 6 is a sectional view of a fourth exemplary embodiment of the shield of PIG. 2.

DETAILED DESCRIPTION OF THE PREFERRED EMBODIMENTS

Figure 1:
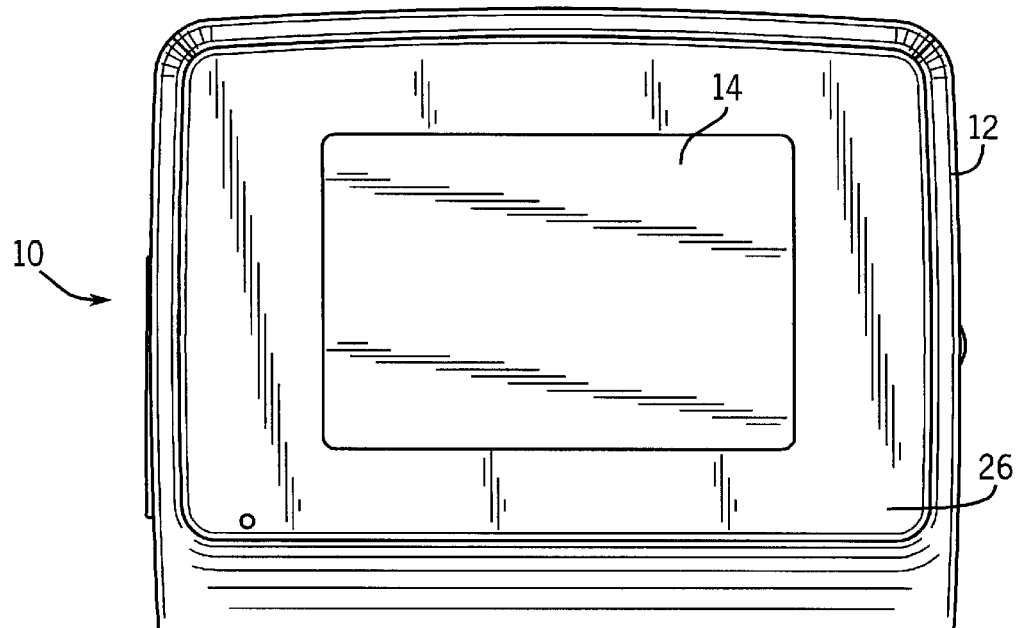
FIG. 1 is a front view of a cab display unit in accordance with the present invention.

FIG. 1 is a front view of a cab display unit 10 which includes a housing 12 and a display 14. Housing 12 provides an encasing for electrical equipment which operate display 14. Housing 12 can be a metal. Alternatively, housing 12 can be a rigid plastic or any other suitable material. In an exemplary embodiment, housing 12 is at least partially made of an electrical noise shielding material.

In one embodiment, housing 12 is formed from a material which shields emanations emitting from electrical equipment contained within display unit 10. Alternatively, housing 12 is coated with a substance which provides for shielding emanations emitting from electrical equipment contained within display unit 10. In such an alternative embodiment, housing 12 can be made of a rigid plastic.

Display 14 provides images which can be displayed as textual or graphical images. Display 14 comprises a liquid crystal display (LCD). Alternatively, display 14 comprises a thin film transistor (TFT) display or any other device for displaying images. In the exemplary embodiment, display 14 is coplanar with a front side of housing 12. In alternative embodiments, display 14 can be recessed within housing 12 or protruding from housing 12.

Figure 2:
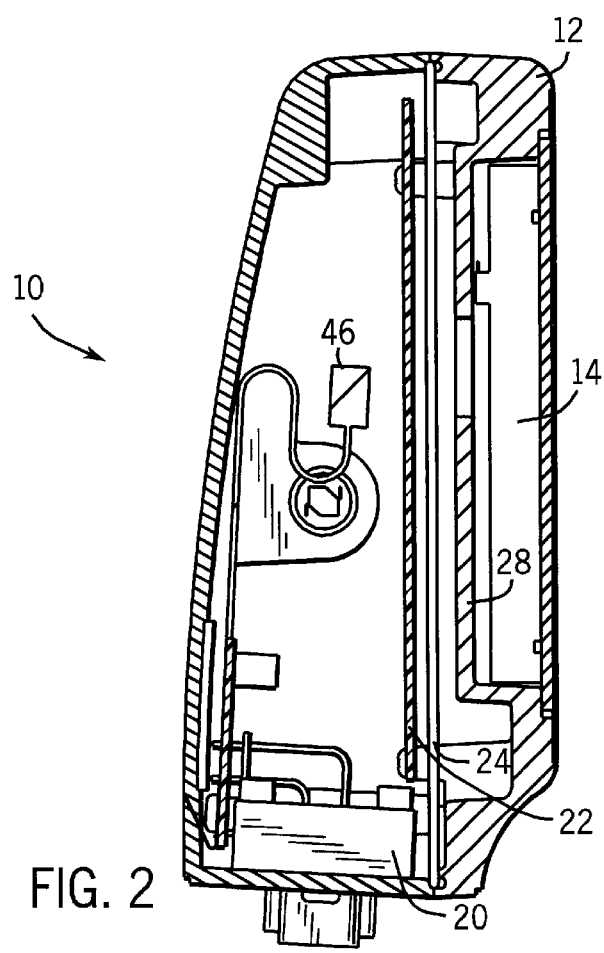
FIG. 2 is a side cutout view of the cab display unit of FIG. 1, including a shield.
Figure 3:
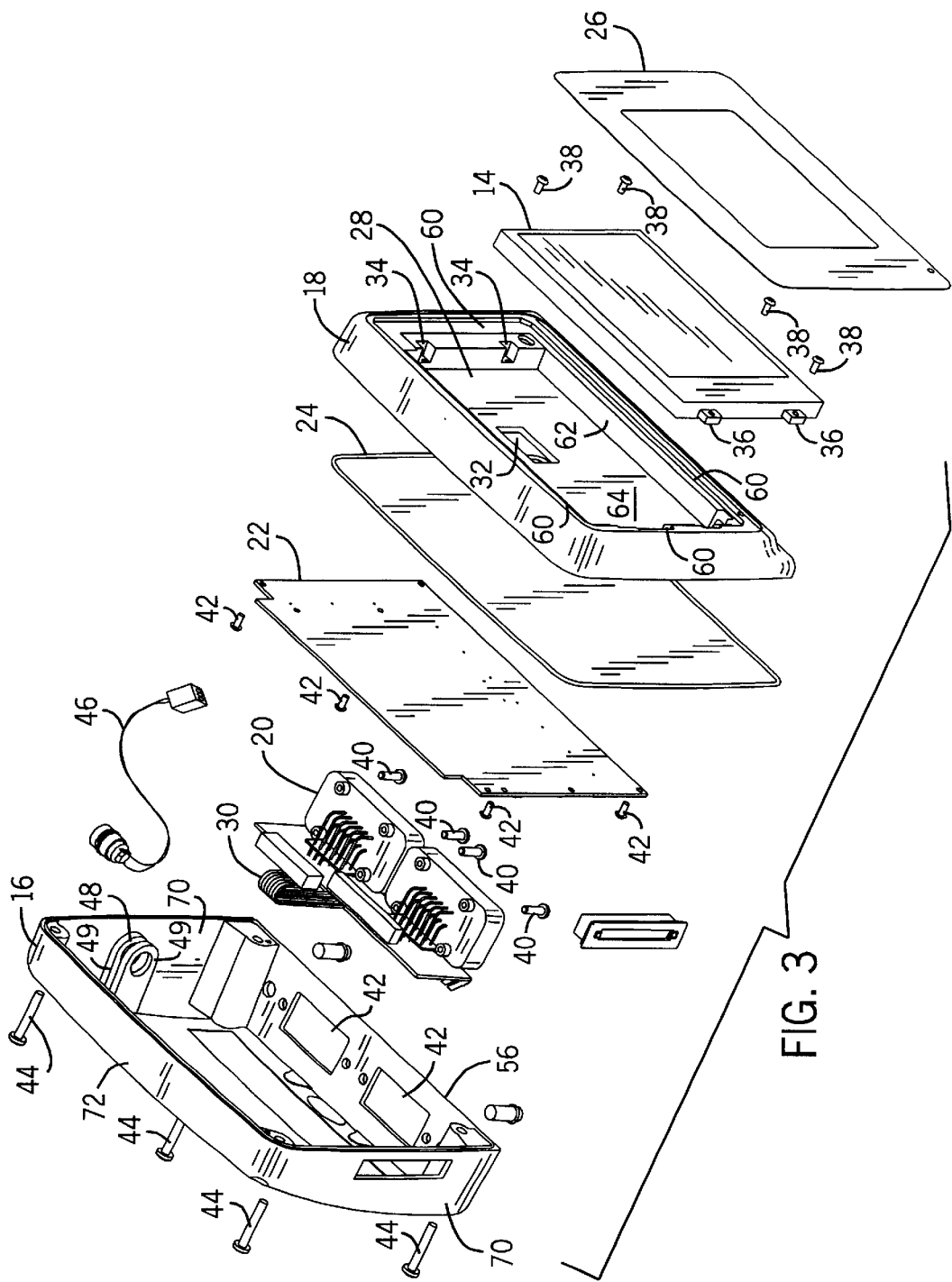
FIG. 3 is an exploded perspective view of the cab display unit of FIG. 1.

FIG. 2 is a sectional view of display unit 10. FIG. 3 is an exploded perspective view of display unit 10. As shown by FIG. 3, housing 12 includes a back housing portion 16 and a front housing portion 18. Mounted to back housing portion 16 and front housing portion 18 are electrical equipment 20, 22, and 24; display 14; and a cover 26. Integrally formed as part of a single unitary body with front housing portion 18 is a shield 28.

Front housing portion 18 includes side walls 60 defining a cavity 64 and extending at least partially into cavity 64 to form a frame 62. Frame 62 defines the perimeter of shield 28. In one embodiment, frame 62 includes recessed guides 34 which receive tabs 36 on display 14. Guides 34 and tabs 36 mate to mount display 14 to front housing portion 18. Display 14 is secured to front housing portion 18 by fasteners 38. In alternative embodiments, guides 34 and tabs 36 are replaced by clips or other types of accessories which are capable of securing display 14 to front housing portion 18.

Back housing portion 16 includes a bottom portion 56, side portions 70, and a top portion 72, forming a shell shape to surround electrical components inside display unit 10. In the exemplary embodiment, back housing portion 16 is made of an electrical noise shielding material, preferably metal. Back housing portion 16 may alternatively be coated in an electrical noise shielding material.

Although back housing portion 16 is illustrated in FIG. 3 as including an integrally formed bottom portion 56, bottom portion 56 may alternatively be integrally formed as part of front housing portion 18, may be formed as a separate member mounted to at least one of the back housing portion 16 and the front housing portion 18, or may be integrally formed as part of a single unitary body with shield 28 and then mounted to at least one of portions 16 and 18.

Electrical equipment 20 is mounted to back housing portion 16 through apertures 42 using fasteners 40. Electrical equipment 22 and 24 are mounted to front housing portion 18 by fasteners 42. Back housing portion 16 and front housing portion 18 are coupled together by fasteners 44. Fasteners can be screws, nails, or any accessory for firmly securing objects to each other.

Electrical equipment 20, 22, and 24 can be any of a variety of electrical components used in the operation of display unit 10. Electrical equipment 20 includes ribbon wire 30 which couples display unit 10 to an external source of input such as a microprocessor, electrical circuitry, or other equipment providing information to display unit 10. In the exemplary embodiment, electrical equipment 22 is a circuit board including electrical components such as capacitors, resistors, and the like. Electrical equipment 24 is also a circuit board including electrical components. In alternative embodiments, display unit 10 may include multiple circuit boards or one single circuit board containing electrical equipment 22 and 24.

In one embodiment, a switch 46 is electrically coupled to electrical equipment 20, 22, and 24. Switch is secured adjacent an aperture 48 in back housing portion 16 by supports 49. Switch 46 allows the user of display unit 10 to turn display 14 on and off by depressing a button on switch 46 which is accessible through aperture 48. In alternative embodiments, display unit 14 is turned on and off by an infrared sensor detecting a signal from a remote control, a control exterior to display unit 10 and connected to display unit via ribbon 30, or any other device which provides for an input to display unit 10.

Shield 28 is located between electrical equipment 20, 22, and 24 and display 14, extending from frame 62 of front housing portion 18. Frame 62 and shield 28 receive display 14. Shield 28 includes an aperture 32 through which wires pass to couple electrical equipment 20, 22, and 24 to display 14. In an exemplary embodiment, shield 28 and front housing portion 18 are integrally formed as part of a single unitary body.

Shield 28 is shown in FIG. 3 as being recessed in front housing portion 18. Advantageously, the recessed configuration forms a pan-shaped cavity into which display 14 is mounted. The pan shape cavity of formed by the integration of front housing portion 18 and shield 28 minimizes the electrical noise, such as RF, EMI, and other electrical emanations from within display unit 10. Displays in conventional display units without electric noise shields can be described as windows through which electrical noise escapes. The perimeter of shield 28 includes frame 62 of side walls 60. Frame 62 surrounds display 14 with electrical noise shielding material as to minimize the electrical noise that emits through display 14.

Notwithstanding the advantages of shield 28 being recessed within cavity 64, shield 28 may alternatively be coplanar with front housing portion 18, may protrude from front housing portion 18, or may be mounted in any location on front housing portion 18 which is intermediate display 14 and electrical equipment 20, 22, and 24.

Although shield 28 is illustrated as having a smooth, flat surface, shield 28 may alternatively have a textured surface, a non-flat construction, or other structural variation which is conducive to shielding electrical emanations.

Shield 28 is manufactured with front housing portion 18 such that shield 28 and front housing portion 18 are integrally formed as part of a single unitary body. Alternatively, shield 28 is formed such that shield 28 and back housing portion 16 are integrally formed as part of a single unitary body, wherein front housing portion 18 and display 14 are mounted to back housing portion 16. In yet another embodiment, shield 28, back housing portion 16, and front housing portion 18 are integrally formed as part of a single unitary body.

FIG. 4 is a sectional view of a shield 128, a first alternative embodiment of shield 28 shown in FIGS. 2 and 3. Shield 128 is identical to shield 28 except that shield 128 is made at least partially of a material 50 that shields emanations emitting from electrical equipment 20, 22, and 24 such that display 14 receives a minimal amount of electrical emanations. Material 50 can be metal or any of a variety of electrical shielding materials. In an alternative embodiment, shield 128 is coated in another material which shields emanations emitting from electrical equipment 20, 22, and 24. Thus, shield 128 is not limited to being made of metal, but rather can be made of rigid plastic or any other suitable material coated with a layer of electrical noise shielding material.

FIG. 5 is a sectional view of a shield 228, a second alternative embodiment of shield 28 shown in FIGS. 2 and 3. Shield 228 is identical to shield 28 except that shield 228 is made of a mixed material 52 which includes electrical noise shielding particles dispersed throughout.

FIG. 6 is a sectional view of shield 328, a third alternative embodiment of shield 28 shown in FIGS. 2 and 3. Shield 328 is identical to shield 28 except that shield 328 is co-molded with housing 12. Where co-molded, shield 328 advantageously is made of the same material as housing 12. Alternatively, one of shield 28 and housing 12 is made at least partially from material 50 and the other is made of mixed material 52.

In operation, electrical equipment 20, 22, and 24 emit various electrical "noise," including electromagnetic interference (EMI) and radio frequency (RF). In one embodiment, front and back housing portions 16 and 18 (collectively housing 12) and shield 28 shield emanations emitting from within display unit 10.

Advantageously, shield 28 permits only a minimal amount of emanations from effecting display 14.

Shield 28 shields emanations such as EMI and RF emitted from electronic equipment 20, 22, and 24 within display unit 10. Shield 28 is durable and improves shielding efficiency. Furthermore, shield 28 is formed at least partially as an integral part of a single unitary body with at least one of back housing portion 16, front housing portion 18, and base portion 56. As such, electrical noise escaping from display unit 10 is minimized while not making manufacturing, installation, or assembly difficult or costly.

It is understood that, while the detailed drawings and specific examples given describe preferred embodiments of the present invention, they are for purpose of illustration only. The present invention is not limited to the precise details, methods, materials, and conditions disclosed. For example, although metal and rigid plastic are suggested for shield 28, other materials may be used. The invention extends to various modifications, combinations, and permutations that nevertheless fall within the scope and spirit of the appended claims.

What is claimed is:

1. A display unit comprising:
   at least one electronic component having a first face;
   a display, having a second face facing the first face, coupled to the at least one electronic component;
   a body extending about the at least one electronic component and supporting the display, wherein the body includes:
   a front portion on a first side of the at least one electronic component and supporting the display;
   a rear portion on a second opposite side of the at least one electronic component;
   a base portion extending between the front portion and the rear portion below the at least one electronic component; and
   a panel substantially disposed between the second face of the at least one electronic component and the first face of the display, wherein the panel includes a first surface portion formed from a non-electrical noise shielding material, a second surface portion opposite the first surface portion and formed from a non-electrical, noise shielding material, and an electrical noise shielding material disposed between the first surface portion and the second surface portion in a direction perpendicular to the first surface portion and the second surface portion, the electrical noise shield material forming a shielding portion formed within the panel as part of a single unitary body with at least one of the front portion, the rear portion, and the base portion, whereby the panel shields emanations emitted from the at least one electronic component and minimizes adverse effects of the emanations on the display.

2. The display unit of claim 1, wherein the front portion and the rear portion are mounted to one another, with the at least one electronic component therebetween.

3. The display unit of claim 1, wherein the panel is integrally formed as part of the front portion.

4. The display unit of claim 3, wherein the front portion includes a display mounting portion projecting from the panel and integrally formed as part of a single unitary body with the panel.

5. The display unit of claim 4, wherein the display mounting portion extends along a plurality of sides of the display to form a cavity at least partially receiving the display.

6. The display unit of claim 1, wherein the shielding portion includes a first layer of non-electrical noise shielding material providing the first surface portion, a second layer of non-electrical noise shielding material opposite the first layer and providing the second surface portion, a third layer of electrical noise shielding material sandwiched between the first layer and the second layer.

7. The display unit of claim 6, wherein the electrical noise shielding material is the same material used to form the body.

8. The display unit of claim 1, wherein the shielding portion includes particles of electrical noise shielding material dispersed throughout and impregnated within the non-electrical noise shielding material.

9. The display unit of claim 1, wherein the panel is recessed in the front portion of the body, wherein the panel forms a shielded cavity, the shielded cavity having at least one shielded edge portion substantially facing at least one perimeter edge of the display, whereby the at least one perimeter edge of the display is shielded by the at least one shielded edge portion.

10. The display unit of claim 9, wherein the panel forms a pan-shaped shielded cavity into which the display is mounted.

11. The display unit of claim 1, wherein the rear portion includes an electrical noise shielding material.

12. The display unit of claim 11, wherein the rear portion includes the electrical noise shielding material.

13. The display unit of claim 1, wherein the front portion is includes an electrical noise shielding material.

14. The display unit of claim 1, wherein the display is a liquid crystal display.

15. The display unit of claim 1, wherein at least one of the front and back portions of the body is made of a material that shields emanations emitting from the at least one electronic component as to not adversely effect electronic equipment not contained in the display unit.

16. The display unit of claim 15, wherein the material is a metal.

17. The display unit of claim 1, wherein the at least one electronic component further includes a circuit board containing electrical components used in operation of the display.

18. A display unit comprising:
    electronic equipment;
    a housing encasing the electronic equipment;
    a display, having at least one perimeter edge, coupled to the electronic equipment;
    a means for shielding emanations emitting from the electronic equipment, the shielding means being integrally formed as a part of a single unitary body with the housing and located between the electronic equipment and the display, the shielding means including a first surface portion formed from a non-electrical noise shielding material, a second surface portion opposite the first surface portion and formed from a non-electrical, noise shielding material, and an electrical noise shielding material disposed between the first surface and the second surface in a direction perpendicular to the first surface and the second surface, the electrical noise shield material forming a shielding portion formed as part of a single unitary body with the housing wherein the shielding means forms a shielded cavity, the shielded cavity having at least one shielded edge portion substantially facing the at least one perimeter edge of the display, whereby the at least one edge of the display is shielded by the at least one shielded edge portion.

19. The display unit of claim 18, wherein the display is a liquid crystal display.

20. The display unit of claim 18, wherein the housing is made of a material that shields emanations emitting from the electronic equipment as to not adversely effect electronic equipment not contained in the display unit.

21. The display unit of claim 20, wherein the material is a metal.

22. The display unit of claim 20, wherein the housing is made of a rigid plastic.

23. The display unit of claim 20, wherein the material is a composite of electrical shielding materials.

24. A display unit which shields emanations emitting from within the display unit, whereby interference with electronic equipment not contained within the display unit is minimized, the display unit comprising:

electronic equipment having a first face;

a housing extending about the electronic equipment;

a display, having a second face facing the first face coupled to the electronic equipment; and a shield, the shield being formed within the housing as part of a single unitary body with the housing and located substantially disposed between the first face of the electronic equipment and the second face of the display, the shield including a first surface portion formed from a non-electrical noise shielding material, a second surface portion opposite the first surface portion and formed from a non-electrical, noise shielding material, and an electrical noise shielding material disposed between the first surface and the second surface in a direction perpendicular to the first surface and the second surface, the electrical noise shield material forming a shielding portion formed within the housing as part of a single unitary body.

25. The display unit of claim 24, wherein the shield and housing are made of the same material.

26. The display unit of claim 25, wherein the material is an electronic noise shielding material.

27. The display unit of claim 24, wherein the shield and housing are co-molded.

28. The display unit of claim 24, wherein the shield includes particles of electrical noise shielding material dispersed throughout and impregnated within the non-electrical noise shielding material.

* * * * *